United States Patent [19]

Vinson

[11] 4,345,681
[45] Aug. 24, 1982

[54] ELEVATOR

[76] Inventor: Victor Vinson, 6 Barnwell, Peterborough, England, PE85PH

[21] Appl. No.: 188,038

[22] Filed: Sep. 17, 1980

[51] Int. Cl.³ .................. B65G 15/14; B65G 19/00
[52] U.S. Cl. .................................................. 198/626
[58] Field of Search ............. 198/721, 728, 626, 604, 198/726

[56] References Cited

U.S. PATENT DOCUMENTS

| | | |
|---|---|---|
| 1,707,725 | 4/1929 | Jantz . |
| 2,152,939 | 4/1939 | Wentworth .................. 198/626 |
| 2,234,465 | 3/1941 | Carroll ......................... 198/604 |
| 2,254,116 | 8/1941 | Cooper ......................... 198/626 |
| 2,539,524 | 1/1951 | Rixon ........................... 198/626 |
| 2,861,673 | 11/1958 | Sandgänger ................. 198/626 |
| 3,698,534 | 10/1972 | Hadfield ...................... 198/626 |

FOREIGN PATENT DOCUMENTS

| | | |
|---|---|---|
| 561066 | 9/1932 | Fed. Rep. of Germany . |
| 1702655 | 7/1955 | Fed. Rep. of Germany . |
| 1128804 | 11/1962 | Fed. Rep. of Germany . |
| 1217857 | 5/1966 | Fed. Rep. of Germany . |
| 395615 | 3/1909 | France . |
| 647597 | 11/1928 | France . |
| 16593 | 3/1959 | German Democratic Rep. . |
| 441077 | 1/1936 | United Kingdom . |
| 681472 | 10/1952 | United Kingdom . |

OTHER PUBLICATIONS

European Search Report.
British Search Report.

Primary Examiner—John J. Love
Assistant Examiner—Brian Bond
Attorney, Agent, or Firm—Steele, Gould & Fried

[57] ABSTRACT

An elevator for farm produce or other articles includes a pair of continuous entrainments each having a series of spaced members, such as rods or rollers, supported by continuous bands. One entrainment is mounted within the other and the inner entrainment is slack over an ascending section so that it normally sags towards a corresponding section of the outer entrainments. When the entrainments are driven, material is picked up by the outer entrainment as it passes around inside a hopper. This travels up the ascending section whereby the slack section of the inner entrainment moves away from the corresponding section of the outer entrainment so that the material is elevated as a rising column. The inner entrainment takes up a natural spacing from the outer entrainment over the elevating sections. The lower end of the inner entrainment may form a converging inlet to assist initial elevation and its upper end may form a diverging outlet to assist in releasing the material at an outlet. The lower end of the inner entrainment may include an idler which is mounted on a radius arm or which is supported at each side in a slot or groove. Conveyors are also described for moving material from a heap into the inlet or hopper of the elevator and for moving material away from the outlet of the elevator.

20 Claims, 6 Drawing Figures

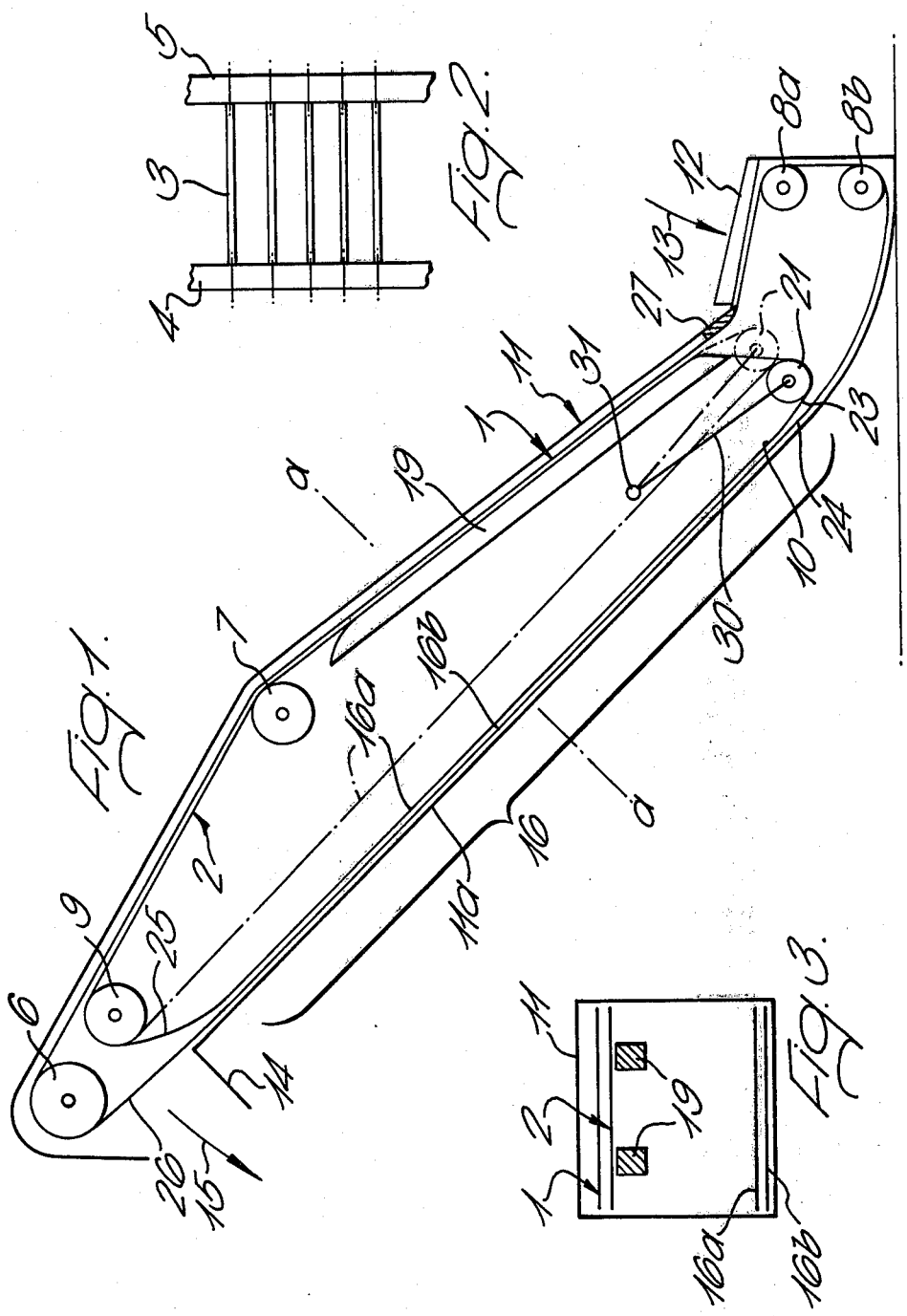

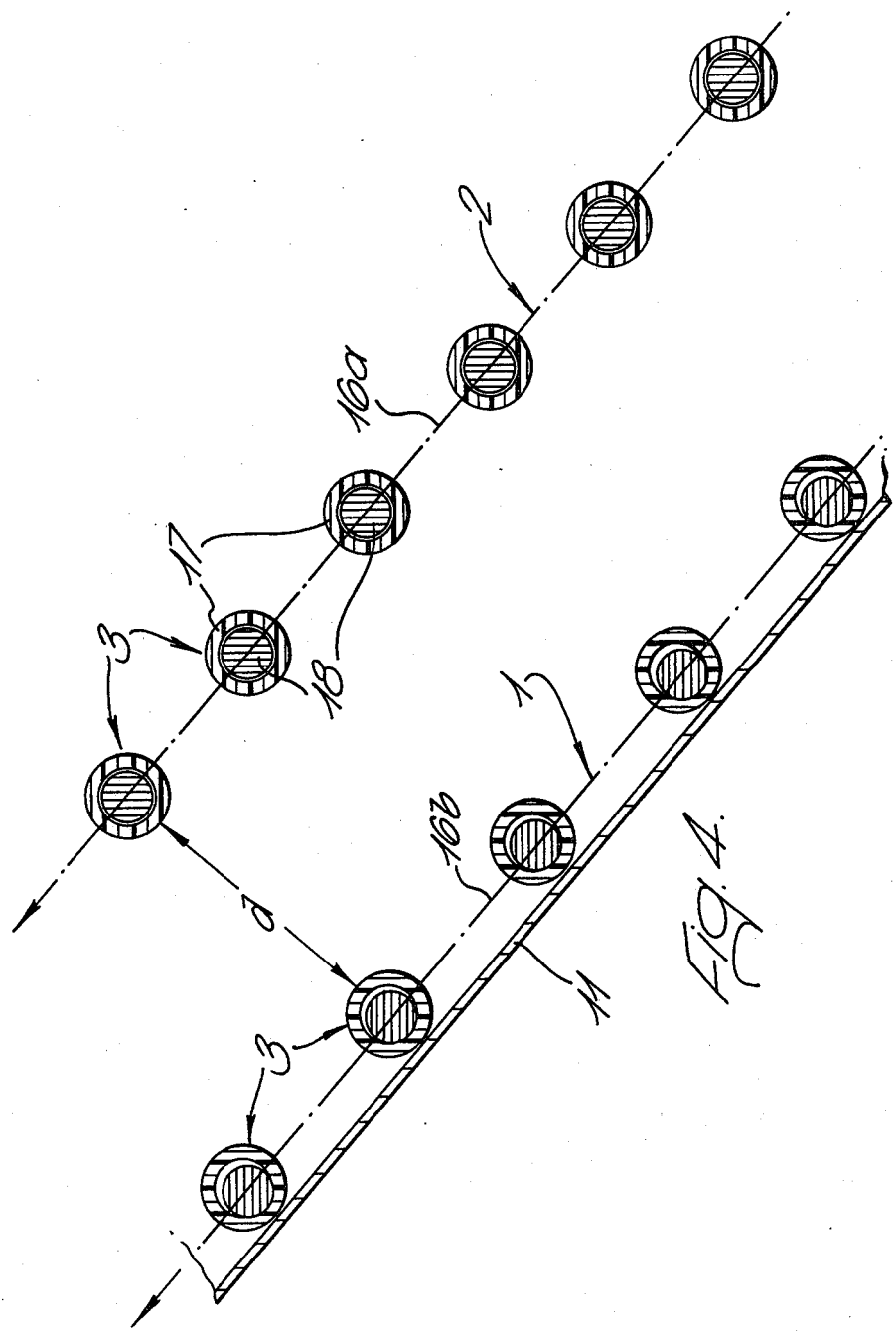

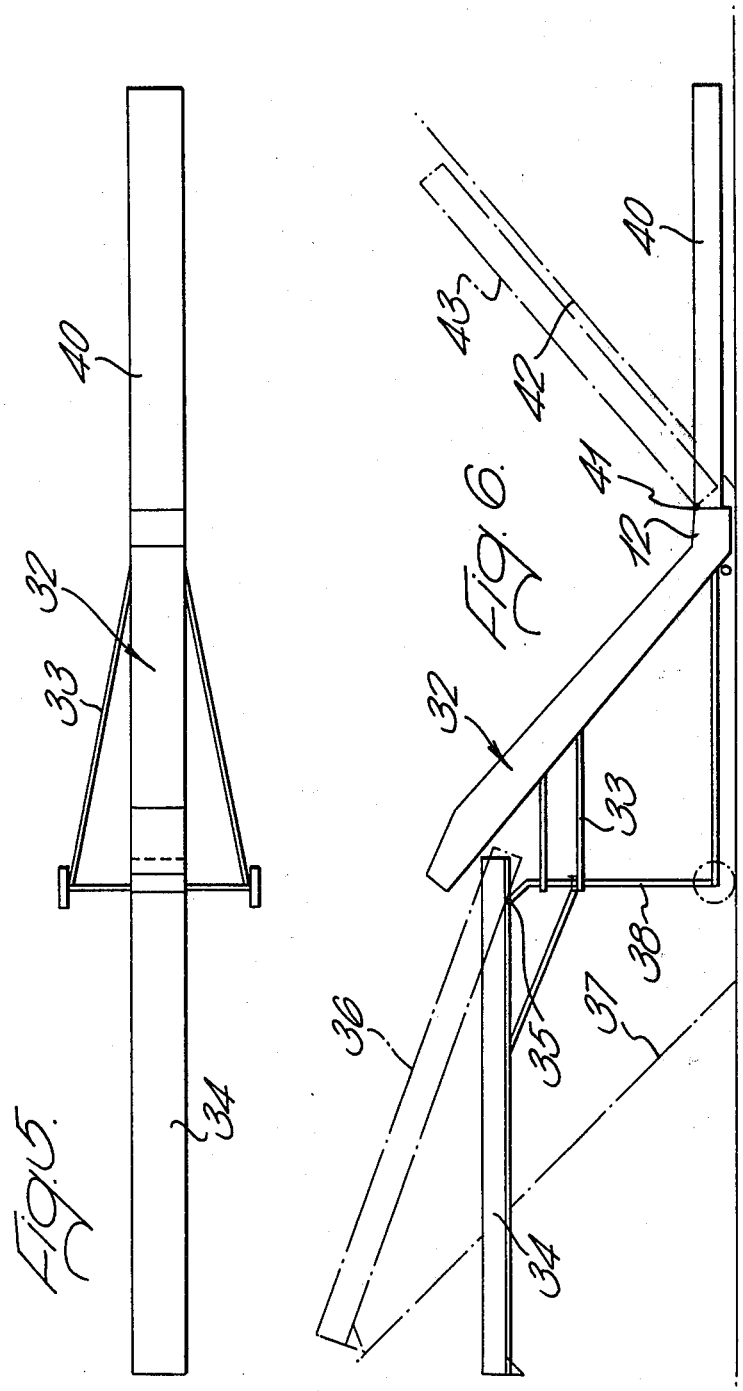

ELEVATOR

This invention relates to an elevator. The elevator is particularly useful for elevating farm produce, including granular material, from a hopper to a raised store. However, it may be used for elevating other articles.

A conventional grain elevator may comprise an auger-shaped member which is axially rotated by a drive motor to move grain from a lower to an upper end. Such an elevator may use a 6 kilowatt (8 h.p.) motor to elevate grain at a rate of 40 tons/hour. Such an elevator is not particularly efficient with regard to the rate at which grain is elevated by a motor of a given power. Moreover, it can damage produce by its grinding action, especially when used to convey beans or peas.

The present invention seeks to provide a more efficient elevator which is more versatile with regard to the produce or articles to be transported.

The invention provides an elevator comprising a pair of continuous entrainments; a support for said entrainments whereby one is mounted within the other and at least a section of one entrainment lies adjacent a corresponding section of the other; at least the outer entrainment being perforate to enable produce or articles to pass therethrough and the support including means which extend alongside said sections of the entrainments and which define an inlet and an outlet, said means retaining produce or articles which are transported up said sections from the inlet to the outlet when said sections are elevated and when said entrainments are driven; and drive means to drive said entrainments simultaneously; said support enabling relative movement between said sections of the inner and the outer entrainments whereby the spacing between said sections varies to accommodate the produce or articles transported from the inlet to the outlet.

An advantage of locating one of the entrainments within the other is that a compact arrangement is possible with both entrainments supported in the same protective casing. This keeps dust, for example, to a minimum and improves the safety factor.

Preferably, a lower end of the outer entrainment passes around the interior of a hopper to pick up the produce or articles and a lower end of the inner entrainment is either floating, or guided for floating movement relative to the outer entrainment so as to act as an adjustable inlet for the transported produce or articles which then move up the elevated sections as a rising column. The lower end of the inner entrainment may be shaped to form a converging inlet to assist initial elevation. Similarly, an upper end of the inner entrainment may be shaped to form a diverging outlet to assist in releasing the produce or articles from said elevated section. A corresponding upper end of the outer entrainment may pass adjacent an outlet port in a casing so as to release the produce or articles into a storage container. In the preferred arrangement, the elevating section lies beneath an upper run of the inner and outer entrainment and a common drive engages the upper runs to move both entrainments in the same direction and at the same speed.

Both entrainments may comprise spaced rods or rollers which are supported, at each side by respective continuous bands. This provides the advantage that the elevator is self cleaning and thus reduces the risk of jamming.

Preferably the inner entrainment is slack over the elevating section compared with the outer entrainment so that the lower end of the inner entrainment floats or is guided for floating movement. This slackness is suitably provided by the positions of idlers and drive sprockets over which the inner entrainment is guided. An upper run of the inner or preferably the inner and outer entrainments may pass over guide members to prevent sag. The inner and outer entrainments suitably pass together over drive sprockets so that they are simultaneously driven.

In operation, an upper end of the elevator is raised with respect to the lower end so that the elevating section makes a required angle with the horizontal. In some cases this may exceed the angle of repose of the material which is transported. The angle of repose may be determined with regard, for example, to a slope at which the material at the top of a heap begins to roll down the inclined side.

A further advantage of the elevator according to the invention is rate of material transport and its power requirements compared with the known augertype of elevator. For example, with a 1.5 kilowatt (2 h.p.) motor up to a 100 tons/hour of grain can be elevated to the same height.

A preferred embodiment of the invention will now be described with reference to the accompanying drawings in which:

FIG. 1 is a schematic side elevation of an elevator according to the invention:

FIG. 2 is a schematic plan view of part of one of the entrainments used in the elevator of FIG. 1;

FIG. 3 is a section on line a—a of FIG. 1;

FIG. 4 is an enlarged view through a section of the entrainments in the elevator of FIG. 1 and FIGS. 5 and 6 are respectively plan and elevational views of the elevator of FIG. 1 with auxillary conveying systems.

Referring to FIGS. 1-3 an elevator comprises two continuous entrainments 1, 2 each in the form of an endless belt or chain with spaced members 3 attached at each side of an endless band 4, 5. Each member 3 may be a rod or a shaft passing freely through a plastic sleeve which acts as a roller, the rods (in either case) being secured at each end to the respective bands 4, 5. Entrainment 1 encloses a region in which entrainment 2 is mounted. The outer entrainment 1 passes over idlers 7, 8a and 8b. The idlers may be arranged in pairs, one at each side of the entrainment adjacent the bands 4, 5. The idlers may comprise wheels, rollers, or sprockets. Pairs of sprockets 6 and 9 (only one of each being shown in FIG. 1) engage both the outer and the inner entrainments 1, 2. The sprockets 9 are fast with the shaft of an electric motor or an internal combustion engine (not shown). Sprockets 9 and 6 are coupled together. The upper runs of the entrainments remain fairly taut between these sprockets and idler 7 and are supported by members 19 between idler 7 and a lower end 10 of the inner entrainment 2. However, the inner entrainment is slack over the lower run between the lower end 10 and the sprockets 9. The lower end 10 may float freely or pass around a roller, idler or sprockets 21 (as shown) supported on a radius arm or arms 30 pivoted to the casing at 31. Alternatively, the roller, idler or sprockets 21 are supported on a shaft which is guided for lateral movement (with respect to the direction of transport) in slots or grooves at each side of the casing. However, neither the radiused arms, nor the grooves or slots (with the respective idlers) are essential since the lower end of the inner entrainment can float freely.

The outer entrainment 1 passes upwardly from idler 8b to idler 6 adjacent a planar member or a part 11a of a casing 11 which surrounds the entrainments. At its lower end, casing 11 forms a hopper 12 to retain material which is poured in at the point designated by an arrow 13. Since the entrainment 1 comprises spaced roller 3, the material passes through the rods or rollers into hopper 12.

An upper end 14 of the casing 11 is turned over to form an outlet for material which leaves the elevator as indicated by an arrow 15.

A section of the elevator which extends between the drive sprocket 9 and the lower end 10 of entrainment 2 is designated by numeral 16. This section transports the material from the hopper 12 to the outlet 14. When the elevator is at rest, section 16a of the inner entrainment 2 sags towards the section 16b of the outer entrainment 1. However, when the drive motor is started and the entrainments are rotating at normal speed, material commences to rise on section 16b of the outer entrainment. Section 16a of the inner entrainment then moves away from section 16b (as indicated by the broken lines in FIG. 1) as the material builds up into a rising column between the sections 16a and 16b. The section 16a of the inner entrainment tends to take up a natural spacing from the section 16b of the outer entrainment during elevation.

As best seen in FIGS. 1 and 3, members 19 extend beneath a section of the upper runs of entrainments 1, 2 and serve as guides which prevent slackness. As seen in FIG. 1, a rubbing block 27 guides the outer entrainment 1 on its descending path before it enters hopper 12. When material is loaded into the elevator, the weight of the material forces the outer entrainment to leave the rubbing block so little or no wear take place in use.

Referring to FIG. 4, this shows a part of the section 16 in greater detail in which rollers 3 of the outer entrainment 1 rotate in contact with the casing 11. Rollers 3 of the inner entrainment 2 are spaced by a distance d from the rollers of the outer entrainment. Each roller comprises an outer plastic sleeve 17 which is freely rotatable on an inner metal rod or shaft 18. The bands 4, 5 have been omitted for clarity.

The lower initial section 23 of the inner entrainment 2 is inclined away from a corresponding section 24 of the outer entrainment 1, so as to form a converging inlet for e.g., grain in the hopper 12. Also an upper final section 25 of the inner entrainment 2 is inclined away from a corresponding section 26 of the outer entrainment 1 to form a diverging outlet. This arrangement assists in feeding the grain to the elevator at the lower end and in releasing it at the upper end.

The inner entrainment might be a continuous imperforate belt but it is preferably perforate. Perforate entrainments provide a self-cleaning action which reduces the risk of jamming.

In a prototype embodiment of the invention, a 1.5 kilowatt (2 h.p.) motor was used with a shaft speed of 1500 r.p.m. reduced through a lay-shaft (or reduction gear box) to 120-150 r.p.m. for driving the entrainments at approximately 37-46 meters/min (120-150 ft/min). This elevated wheat with a moisture content of 16% at a rate of 80-100 tons/hour.

The elevator can be used for transporting farm produce, for example, grain beans and peas and also for transporting any granular material which is smaller than the pitch of the entrainment (i.e. distance between the members 3).

One surprising effect of the elevator described above is its efficient transport of granular material which is much smaller than the pitch of the inner and outer entrainments. This material passes easily through the spaces between the members 3 when poured into the hopper 12 and yet is transported up the elevating section as section 16a of the inner entrainment 2 moves away from the section 16d of the outer entrainment 1. Preferably, only a running clearance is provided between the sides of bands 4, 5 and the sides of the casing 1.

Referring to FIGS. 5 and 6, this shows an elevator 32, according to the invention, which is mounted on a wheeled chassis 33. A conveyor 34 is hingedly supported at 35 on the chassis 33 and it may be elevated by known hydraulic means, to a position as shown by the broken lines 36. The conveyor 34 includes a single entrainment (not shown), which may be made of similar material to that used for the entrainments 1, 2 in the elevator. This entrainment passes over idlers and sprockets (not shown) extending along the length of a trough-like casing forming the conveyor 34. Thus, as material leaves the top of the elevator 32 it falls onto one end of the conveyor 34 and it is then carried along the conveyor to exit at the far end to form a heap 37. Leg 38 of the chassis 33 may be pivotally mounted so as to enable the far end of conveyor 34 to be swung on an arc to direct the discharge in different directions.

FIGS. 5 and 6 also show a rear conveyor 40 which is hingedly attached to the conveyor 32 at 41. Conveyor 6 is of similar construction to conveyor 34 except that the continuous entrainment is mounted in an inverted trough and it is used to scrape material from a heap 42 into the hopper end 12 of the elevator. The conveyor 40 is shown elevated into a position indicated by the broken lines 43 where it rests against the side of the heap 42 (at its angle of repose). As material is scraped down towards the hopper end 12, more material tends to fill the "gap" since it pours down from the top and the sides of the heap. The conveyor 40 is detachable from the elevator 32 and is used only when unloading from store.

What is claimed is:

1. An elevator comprising:
   a pair of continuous entrainments mounted one within the other and at least a section of one entrainment lying adjacent a corresponding section of the other, at least the outer entrainment being perforate to enable material being transported to pass therethrough;
   drive means for driving said entrainments simultaneously; and,
   a support for the entrainments including means which extend alongside said corresponding sections of the entrainments and which define an inlet and an outlet, said means retaining the material which is transported by said sections from the inlet to the outlet when said sections are elevated and when said entrainments are driven, said support enabling floating movement of a lower end portion of said inner entrainment relative to said outer entrainment and thereby enabling relative movement between said sections of the inner and outer entrainments whereby the spacing between said sections varies to accommodate the material transported from the inlet to the outlet.

2. An elevator according to claim 1 wherein the lower end of the inner entrainment is freely floating.

3. An elevator according to claim 1 wherein the lower end of the inner entrainment passes around rotatable means supported on a pivoted radius arm.

4. An elevator according to claim 1 wherein the lower end of the inner entrainment passes around rotatable means supported for movement, at each side, in an elongated guide.

5. An elevator according to claim 1 wherein the inner entrainment is guided over idlers and drive sprockets so that it is slack over said corresponding section.

6. An elevator according to claim 5 wherein an upper run of at least one of the inner entrainment and both the inner and outer entrainments passes over guide members to prevent sag.

7. An elevator according to claim 1 wherein the lower end of the inner entrainment is shaped to form a converging inlet to assist initial elevation.

8. An elevator according to claim 1 wherein an upper end of the inner entrainment is shaped to form a diverging outlet to assist in releasing the produce or articles at the outlet.

9. An elevator according to claim 1 wherein the drive means engages upper runs of both the inner and the outer entrainments whereby they are driven simultaneously.

10. An elevator according to claim 1 wherein both the inner and outer entrainments comprise spaced members which are supported, at each side by respective continuous bands.

11. An elevator according to claim 1 wherein the means which extend alongside said corresponding sections of the entrainments is part of a casing which encloses both entrainments apart from the inlet and outlet.

12. An elevator according to claim 1 wherein a hopper is provided at the inlet and wherein the outer entrainment is supported by idlers such that it passes around the interior of the hopper to pick up produce or articles therein.

13. An elevator according to claim 1 further comprising: a movable chassis for supporting the elevator; and, a first conveyor, also supported by the chassis, for receiving the material from the outlet.

14. An elevator according to claim 13 wherein the first conveyor is pivotally mounted on the chassis and is provided with means to enable a remote end to be elevated with respect to the outlet of the elevator.

15. An elevator according to claims 13 or 14 further comprising a second conveyor pivotally mounted at the inlet end of the elevator and provided with means to enable a remote end to be elevated with respect to the inlet whereby the second conveyor is used to move the material, arranged in a heap, into the inlet of the elevator.

16. An elevator according to claim 1, wherein the outer entrainment passes under the inlet and over the outlet, the material falling through the outer entrainment during loading and discharge.

17. An elevator capable of elevating granular material, the elevator comprising:

housing means having an inlet, a hopper section adjacent the inlet, an outlet and an inclined ramp section intermediate said inlet and outlet;

inner and outer continuous belts, at least the outer belt being perforate such that the granular material can pass therethrough;

drive means for driving the belts simultaneously; and, guiding means for said belts within said housing means, said inner and outer belts being mounted on said guiding means so that said inner belt is within said outer belt, so that said belts extend longitudinally of said inclined ramp section to form respective ascending lower runs, so that a lower end section of said inner belt is freely movable relative to the ascending lower run of said outer belt and so that the ascending lower run of said inner belt normally engages the ascending lower run of said outer belt over the inclined ramp section, said guiding means including:

first guide means located adjacent said outlet for supporting respective upper end portions of said inner and outer belts;

second guide means located intermediate said inlet and outlet for supporting upper descending runs of said inner and outer belts; and, third guide means for supporting a lower end section of said outer belt so that said lower end section of said outer belt is spaced apart from said lower end portion of said inner belt to enable said lower end section of said outer belt to pass around the hopper section of said housing means;

whereby the granular material falls through the second belt adjacent the inlet and is received in the hopper section where it is transported initially by the lower end section of said outer belt towards said lower end portion of said inner belt, said guiding means enabling said lower end portion of said inner belt and said ascending lower run of said inner belt to move away from the ascending lower run of said outer belt to accommodate a rising column of said granular material which is thereby transported up the inclined ramp section to the outlet.

18. The elevator of claim 17, further comprising fourth guide means including a guide roller and a pivoted radius arm means therefor, for the movable lower end section of said inner belt.

19. The elevator of claim 17, further comprising fourth guide means including a guide roller and an elongated guide slot therefor, for the movable lower end section of said inner belt.

20. The elevator of claim 17, 18 or 19, wherein said first guide means includes respective guide means for rotatably supporting the upper portions of said inner and outer belts, said respective guide means being spaced apart whereby the respective upper portions of said inner and outer belts, in the ascending lower runs, diverge to assist in releasing the granular material at said outlet.

* * * * *